United States Patent [19]
Hignett et al.

[11] Patent Number: 5,171,376
[45] Date of Patent: Dec. 15, 1992

[54] FLUXES FOR ALUMINIUM BRAZING OR WELDING

[75] Inventors: Geoffrey J. Hignett; Alastair McNeillie; David Slater, all of Cheshire, England

[73] Assignee: Laporte Industries Limited, London, England

[21] Appl. No.: 710,528

[22] Filed: Jun. 4, 1991

[30] Foreign Application Priority Data

Jun. 12, 1990 [GB] United Kingdom ............... 9013043

[51] Int. Cl.$^5$ ............................................. B23K 35/34
[52] U.S. Cl. ........................................ 148/23; 148/26
[58] Field of Search ................................... 148/23, 26

[56] References Cited

U.S. PATENT DOCUMENTS

| | | | |
|---|---|---|---|
| 3,497,400 | 2/1970 | Stokes | 148/26 |
| 3,511,701 | 5/1970 | Mouton | 148/26 |
| 3,951,328 | 4/1976 | Wallace | 148/26 |
| 4,475,960 | 10/1984 | Yamawaki | 148/26 |
| 4,579,605 | 4/1986 | Kawase | 148/26 |
| 4,619,716 | 10/1986 | Suzuki | 148/26 |
| 4,723,597 | 2/1985 | Sonoda | 148/26 |

FOREIGN PATENT DOCUMENTS

| | | |
|---|---|---|
| 1265089 | 5/1961 | France . |
| 859171 | 8/1957 | United Kingdom . |
| 1268812 | 4/1969 | United Kingdom . |
| 1438955 | 8/1972 | United Kingdom . |

OTHER PUBLICATIONS

Patent Abstracts of Japan, vol. 9, No. 231 (M414) [1954] & JP-A-6087993.

*Primary Examiner*—Peter D. Rosenberg
*Attorney, Agent, or Firm*—Kane, Dalsimer, Sullivan, Kurucz, Levy, Eisele and Richard

[57] ABSTRACT

Fluxes for aluminium brazing or welding may be produced by grinding the slag by-product of aluminium boron master alloy production. The grinding is preferably to below 75 microns size but particularly preferably to below 30 microns size. The fluxes may be mixed into water to produce a stable, mobile slurry which may be spray-applied to an aluminium work-piece.

10 Claims, No Drawings

FLUXES FOR ALUMINIUM BRAZING OR WELDING

BACKGROUND OF THE INVENTION

1. Field of the Invention

This invention concerns compositions suitable for use fluxes for brazing or welding in the aluminium fabrication industries.

2. Brief Description of Related Art

It has been common practice to use a flux to assist in the brazing or welding of aluminium in the radiator or other aluminium fabrication industries. The flux acts to destroy the oxide film which forms on aluminium surfaces thereby improving the flow of molten aluminium and/or of the molten filler or other jointing material.

Fluxes based on chlorides or on mixtures of chlorides with fluorides are known but have disadvantages because they give rise to corrosion in the aluminium and require to be removed from the brazed or welded article by water washing.

As an improvement over chloride fluxes, fluxes based on alkali metal, particularly potassium fluoaluminates, have been developed. Such fluxes may be prepared by mixing individual presynthesised alkali metal fluoaluminates, alkali metal fluorides or aluminium fluorides to desired proportions.

A substantial proportion of fluoaluminate fluxes are produced by wet chemical processes. A flux described in U.S. Pat. No. 4579605 of Furukuwa Aluminium Co. comprises 5% to 95 wt % of $K_2AlF_5$ or $K_2AlF_5.H_2$) and the remainder of $KAlF_4$ and may be prepared by dissolving aluminium hydroxide in hydrofluoric acid having a concentration of 5% to 40% by weight to give an Al:F ratio of 1:4 to 1:4.5 and neutralising this mixture with potassium carbonate or hydroxide to give a Al:K ratio of 1:1–1.5.

Japanese Patent Specification No. 60-87993 of Sumitomo Light Metal Industries describes a fluoaluminate type flux which has the advantage of a slightly lower working temperature. This flux consists essentially of a mixture of b 60% to 70% wt of $K_3AlF_6$, 27% to 37% wt of $AlF_3$ and 0.1% to 10% wt of $KBF_4$ in which the $KBF_4$ component and its proportion are critical. It may be prepared by mixing the three above identified compounds which mixture may be used as such or after fusing, solidifying and pulverising the solidified material into a powder.

SUMMARY OF THE INVENTION

According to the present invention there is provided a flux for brazing or welding aluminium comprising a boron-containing potassium fluoroaluminate slag, having an aluminium to fluorine atomic ratio of 1:3 to 5, an aluminium to potassium atomic ratio of 1:<1.25 and a boron content of at least 0.05% by weight. This flux is particularly suitable for application by spraying, and is preferably prepared from slag formed in the production of an aluminium-boron alloy.

In another aspect, the present invention provides a composition, suitable for use in or as a flux for brazing or welding aluminium, comprising particles of a boron-containing potassium-fluoroaluminate slag, having a boron content of at least 0.05% by weight of the slag, wherein at least 90% by weight of the particles have a particle size below 75 microns ($75 \times 10^{-6}$m) The composition does not essentially require the inclusion of the distinct compound $KBF_4$, and utilises an industrial by-product as raw material and is therefore advantageous economically. The basis for this composition is slag from the production of an aluminium-boron alloy. Also this composition when used in or as a flux is particularly suitable for application by spraying.

DETAILED DESCRIPTION OF THE PREFERRED EMBODIMENTS OF THE INVENTION

Boron is a desired component in some aluminium or aluminium alloy products since it tends to act as a grain refining agent and to impart abrasion resistance and a capacity for absorbing neutrons. While boron is required only in a small quantity of the order of 100 to 500 parts per million in an aluminium or aluminium alloy melt, it is commonly included in the form of an aluminium-boron master alloy which may contain boron in a quantity of the order of 1% to 30% by weight. The manufacture of such an alloy may be accomplished by the introduction of an alkali metal, suitably a potassium fluoborate, into the molten aluminium, for example as taught in French Patent No. 1265089 or other alkali metal fluorides in conjunction with potassium fluoborate, for example as taught in United Kingdom Patent No. 1268812.

The slag which forms in consequence of such additions is found to contain substantial quantities of alkali metal fluoaluminates together with small quantities of the alloying metal and very small quantities of other metals. It is understood that such slag tends to be non-homogeneous as a result of its method of formation since different constituents may have different tendencies to slag. However, if samples are taken by boring through the slag normal to the layers that may have formed and particularly if more than one sample is taken, reasonably representative analyses may be obtained.

The slags which have been found to be useful according to the present invention are those derived from the production of aluminium-boron master alloys which slags usually contain at least 0.05% of boron expressed as the metal. Such a content of boron corresponds to a substantial content of boron in the master alloy, for example above 1% by weight of the master alloy. The aluminium to fluorine atomic ratio of these slags is 1 to 3–5 usually 1 to 4–4.5 an aluminium to potassium atomic ratio of about 1 to <1.25 which is consistent with the disclosure of U.S. Pat. No. 4,579,605 but not consistent with the disclosure of the Japanese Patent Specification which indicates a composition which corresponds to an aluminium to potassium atomic ratio of 1 to 1.25–1.32.

To produce an aluminium brazing or welding flux the slag from the aluminium-boron master alloy melt is preferably broken up by crushing and then ground to produce a finely divided powder. There may be lumps of aluminium alloy present in the slag and these are preferably removed after the first, coarse, crushing stage since they detract from the effectiveness of the subsequent grinding stages. It has been usual in the art to grind aluminium brazing fluxes to about 150 microns particle size. According to this invention, however, the performance of the flux may be improved by grinding so that at least 90% by weight has a particle size which is, preferably, below 75 microns but is, particularly preferably, below 30 microns. Methods for grinding to these levels and for checking the particle size are available in the art.

The preferred method of using a flux is to form a dispersion of the flux in water and to apply the dispersion to the relevant part of the component or assembly of components to be brazed or welded. The method of application may be by brushing or trowelling onto the work-piece for which method the flux is preferably in the form of a paste containing relatively little water which is not subject to the problem of settling nor require mobility, or by immersion of the work-piece in the flux dispersion, in which method the flux dispersion is more dilute but may be maintained as a single phase by agitation or, very commonly, by spraying the dispersion onto the work-piece in which method the dispersion is again relatively dilute. For this last method a suitable concentration of the flux in the water may be, for example, 10% to 50%, preferably 25% to 35%, by weight, dispersion stability is important to avoid settling in the equipment and mobility is important for spraying efficiency.

By way of example four slags were sampled and analysed and were ground such that 90% by weight had a particle size below 75 micron BSS to produce flux powders. The powders were mixed in water at 30% w/w concentration to test slurry stability.

The slags are identified as follows:

| | |
|---|---|
| Slag A | From a 4% wt boron-aluminium master alloy |
| Slag B | From a 5% titanium-1% boron master alloy |
| Slag C | From a 3% titanium-1% boron master alloy |
| Slag D | From a 5% zirconium master alloy. |

The results of analysis of these slags including three separate samples of Slag A and two separate samples of Slag B is given in the following Table together with an indication of the slurry stability and sprayability of the corresponding fluxes. following Table.

The fluxes produced from slags A1, A2 and A3 perform effectively in use to braze aluminium.

TABLE I

| Constituent wt % as oxide | A1 | A2 | A3 | B1 | B2 | C | D |
|---|---|---|---|---|---|---|---|
| $Al_2O_3$ | 35.5 | 36.4 | 37.9 | 32.0 | 32.1 | 32.4 | 30.7 |
| $SiO_2$ | <0.01 | <0.01 | <0.01 | <0.01 | <0.01 | <0.01 | <0.01 |
| $K_2O$ | 35.7 | 34.7 | 31.6 | 39.9 | 39.2 | 38.7 | 42.6 |
| BaO | 0.14 | 0.01 | <0.01 | 0.01 | 0.01 | 0.02 | 0.01 |
| CaO | <0.10 | <0.01 | 0.01 | <0.01 | <0.01 | <0.01 | <0.01 |
| $TiO_2$ | 0.01 | 0.02 | 0.02 | 0.14 | 0.76 | 0.40 | <0.01 |
| $Fe_2O_3$ | <0.01 | <0.01 | <0.01 | <0.01 | <0.01 | <0.01 | <0.01 |
| SiO | <0.01 | <0.01 | <0.01 | <0.01 | <0.01 | <0.01 | <0.01 |
| MgO | <0.01 | <0.01 | <0.01 | <0.01 | <0.01 | <0.01 | <0.01 |
| $Na_2O$ | 0.19 | 0.14 | 1.3 | 0.10 | 0.06 | 0.11 | 0.04 |
| B* | 0.03 | 0.12 | 0.13 | <0.01 | 0.03 | 0.07 | <0.01 |
| Al+ | 1 | 1 | 1 | 1 | 1 | 1 | 1 |
| K+ | 1.22 | 1.16 | 1.02 | 1.48 | 1.46 | 1.42 | 1.63 |
| F+ | 4.4 | 4.36 | 3.38 | 4.33 | 4.78 | 4.56 | 4.35 |
| M. Pt | 553° C. | — | — | 557° C. | — | 555° C. | 555° C. |
| Slurry | STABLE-SPRAYABLE | | | GELS-NOT SPRAYABLE | | | |

\* = calculated as metal
+ = atomic ratios Al:K:F

It has been found that while the slags utilised according to the invention form stable, mobile dispersions which are suitable for spray application, particularly when in the fine particle size taught, slags from other aluminium master alloys do not. Slags from aluminium master alloys containing 3% to 5% titanium and 1% boron, which slags usually contain on average below 0.05% but usually at least 0.01% of boron and a greater quantity of titanium form thick non-sprayable gels when dispersed in water. Slags from aluminium- zirconium master alloys, usually containing below 0.01% of boron also give non-sprayable gels. Such slags are not usable, therefore, for a main purpose of the invention. While all the slags examined had residual contents of the alloying metal and varying contents of aluminium, fluorine and of alkali metal the slags from different master alloys could not be distinguished as to their structures by X-ray diffraction or by differential scanning calorimetry. X-ray fluorescence examination indicated in all cases the presence of alkali metal fluoaluminates. In all cases the slags melted in the range 553°-557° C. The ineffectiveness of slags with below 0.05% wt of boron calculated as the metal is, not explicable.

In yet another aspect, the present invention provides a method for the production of an aluminium brazing or welding flux comprising crushing and grinding a boron-containing potassium fluoroaluminate slag. The invention also provides the use of a slag in the production of an aluminium brazing or welding flux.

What is claimed is:

1. A composition, suitable for use in or as a flux for brazing or welding aluminum, comprising particles of a boron-containing potassium-fluoroaluminate slag, having a boron content of at least 0.05% by weight of the slag, wherein at least 90% by weight of the particles have a particle size below 75 microns ($75 \times 10^{-6}$m).

2. A composition as claimed in claim 5, wherein the composition comprises 10% to 50% by weight slag particles.

3. A composition as claimed in claim 5 wherein the composition comprises at least 50% by weight water and is in the form of a stable, mobile dispersion.

4. A composition as claimed in claim 5, wherein at least 90% by weight of the slag particles have a particle size below 30 microns ($30 \times 10^{-6}$m).

5. A method for the production of an aluminium brazing or welding flux comprising crushing and grinding a boron-containing potassium fluoroaluminate slag, comprising 0.05% by weight boron, into particles wherein at least 90% by weight of the particles have a particle size below 75 microns ($75 \times 10^{-6}$m).

6. A method for the production of an aluminium brazing or welding flux comprising crushing and grinding a boron-containing potassium fluoroaluminate slag, formed in the production of an aluminium-boron master alloy comprising more than 1% by weight boron, into particles, wherein at least 90% by weight of the particles have a particle size below 75 microns ($75 \times 10^{-6}$m).

7. Use of a slag from an aluminium-boron master alloy melt, wherein the slag comprises at least 0.05% by weight Boron, in the production of an aluminium brazing or welding flux.

8. Use of a slag from an aluminium-boron master alloy melt, wherein the master alloy comprises more than 1% by weight boron, in the production of an aluminium brazing or welding flux.

9. A composition of claim 5 wherein the slag has an aluminum to fluorine atomic ratio of 1:3-5 and an aluminum to potassium atomic ratio of 1:<1.25.

10. A composition of claim 13 wherein the slag has an aluminum to fluorine atomic ratio of 1:4-4.5.

* * * * *